United States Patent [19]

Appel et al.

[11] 3,873,495

[45] Mar. 25, 1975

[54] POWDER FORM COATING AGENTS

[75] Inventors: Hansgunter Appel, Bergisch-Gladbach; Dieter Arlt, Cologne; Richard Muller, Bergisch Neukirchen; Frank Wingler, Leverkusen, all of Germany

[73] Assignee: Bayer Aktiengesellschaft, Leverkusen, Germany

[22] Filed: June 26, 1974

[21] Appl. No.: 483,233

Related U.S. Application Data

[63] Continuation-in-part of Ser. No. 428,457, Dec. 26, 1973, abandoned, which is a continuation-in-part of Ser. No. 303,143, Nov. 2, 1972, abandoned.

[30] Foreign Application Priority Data

Nov. 6, 1971 Germany............................ 2155257

[52] U.S. Cl............... 260/42.29, 117/17, 260/17 R, 260/42.21, 260/42.22, 260/42.24, 260/42.26, 260/42.52, 260/78.5 T, 260/80.8, 260/80.81, 260/244 R, 260/246 B

[51] Int. Cl........................ C08f 45/04, C08f 15/40

[58] Field of Search........... 260/42.29, 42.21, 42.22, 260/42.24, 42.26, 17 R, 78.5 T, 80.8, 244 R, 246 B, 307

[56] References Cited

UNITED STATES PATENTS

| | | | |
|---|---|---|---|
| 3,419,520 | 12/1968 | Campbell et al.................. | 260/41.5 |
| 3,493,575 | 2/1970 | Tomalia.......................... | 260/244 R |
| 3,752,793 | 8/1973 | Arlt et al........................ | 260/78.5 T |

*Primary Examiner*—James H. Derrington
*Attorney, Agent, or Firm*—Connolly and Hutz

[57] ABSTRACT

Coating powders comprising mixtures of poly-(5,6-dihydro-4H-1,3-oxazines) and copolymers of 25-70% by weight of styrenes and/or (meth)acrylonitrile, 30-65% by weight of (meth)acrylates (the methyl methacrylate content is not greater than 25%) and 5-20% by weight of $\alpha,\beta$-monoolefinic unsaturated carboxylic acid having 3-5 carbon atoms and optionally pigments or levelling agents. The powders are suitable for use in the electrostatic powder spraying process.

9 Claims, No Drawings

POWDER FORM COATING AGENTS

CROSS-REFERENCE TO RELATED APPLICATION

This application is a continuation-in-part of application Ser. No. 428,457 filed Dec. 26, 1973 now abandoned, which, in turn, is a continuation-in-part of application Ser. No. 303,143 filed Nov. 2, 1972 and now abandoned.

This invention relates to novel coating powders comprising mixtures of poly-(5,6-dihydro-4H-1,3-oxazines) and polymers containing carboxylic acid groups. These powders are suitable for use in the electrostatic powder-spraying process.

Binders for use in electrostatic powder spraying should be brittle, readily powdered resins in their uncrosslinked form, which, as powders, remain free-flowing and do not lump at temperatures of up to 50°C. Following electrostatic application to the substrate, the powders should level out smoothly at temperatures of from 80° to 120°C and they should bake to form insoluble, infusible coatings at temperatures above 130°C. The powders must also be able to take an electrostatic charge and hold this charge after application to metal articles for a sufficient length of time until they are baked. In addition, such binders should not prematurely cross-link near their levelling temperature because, in general, they are mixed with pigments, catalysts and levelling agents in the melt at temperatures of approximately 100°C. In cases where an external crosslinking agent is used, as in the process according to the invention, the component which acts as the crosslinking agent should melt at a temperature at which the resin also melts and should be compatible and homogeneously miscible with the resin. When the mixture hardens, the crosslinking agent which has been added should not affect the storage properties of the mixture at temperatures of up to 50°C, and the system should not disintegrate on cooling. After levelling and baking, the compatible mixture of crosslinking agent and resin should give a high-gloss, weather resistant coating which is unaffected by chemicals and by solvents.

Powder lacquers based on polyepoxides are known and these satisfy most of the requirements referred to above, although their resistance to weathering is inadequate for a number of applications. The inadequate weathering resistance of epoxide powder lacquers has prompted industry to develop powder lacquers based on acrylates. Such acrylate powder lacquers are described, for example, in French Patent Specification No. 2,035,185. These resins contain methylmethylol ether groups which are firmly anchored in the polymer and which allow thermal crosslinking. Unfortunately, such resins show inadequate stability in storage at elevated temperatures of the kind which can occur in particular during transportation in Southern countries. The resins generally begin to lump at temperatures as low as 40° and thereafter are no longer freeflowing. Permanent free-flow properties are, however, essential to any powder-application process.

The crosslinkable coating mixtures in powder form according to the invention effectively satisfy the aforementioned requirements for electrostatic powder spraying.

Accordingly, the invention relates to coating powders suitable for the electrostatic powder-spraying process, comprising mixtures of copolymers of:

A. polymerised units of

I from 25 to 65%, preferably 25 to 50%, by weight of styrene, α methyl styrene o-chlorostyrene, p-chlorostyrene, p-tert-butylstyrene, (meth)acrylonitrile or a mixture thereof;

II from 30 to 65% by weight of an acrylic acid ester having from 1 to 12 carbon atoms in the alcohol radical or a methacrylic acid ester having 2 to 12 carbon atoms in the alcohol radical, or a mixture thereof;

III from 0 to 25% by weight of methacrylic acid methyl ester and

IV from 5 to 20% by weight of acrylic acid, methacrylic acid, itaconic acid, maleic, fumaric acid, crotonic acid or a mixture thereof, the average molecular weight being from about 3,000 to 20,000, (B) at least one bis- or tris-(5,6-dihydro-4H-1,3-oxazine), and (C) optionally additives such as pigments and levelling agents, the mixtures containing from 5 to 25 parts by weight of the bis- or tris-(5,6-dihydro-4H-1,3-oxazine) (B) to from 95 to 75 parts by weight of the acrylic resin (A), and up to 150% by weight, based on (A) and (B) of pigments and from 0.1 to 5% by weight, based on (A), of a levelling agent.

Preferred coating powders include those wherein the sum of the percentage contents of I to IV is 100.

The powders according to the invention remain free-flowing at temperatures above 50°C., have a grain size of from about 30 to about 120μ and have the advantage of not giving off any volatile constituents during baking.

Poly-(5,6-dihydro-4H-1,3-oxazines) of the following general formula are of particular interest for use in the mixtures according to the invention:

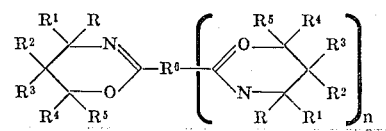

in which n represents 1 or 2;

R, $R^1$, $R^2$, $R^3$, $R^4$ and $R^5$ are the same or different and each represents a hydrogen atom or a hydrocarbon radical having from 1 to 6 carbon atoms which is preferably saturated and $R^6$ represents a bond or a radical from the following groups:

i. a cycloaliphatic hydrocarbon radical with 3 to 10 and preferably 5 to 6 carbon atoms, an optionally partially unsaturated alkylene radical with 1 to 18 carbon atoms, preferably 2 to 12 carbon atoms which may optionally be interrupted by one or more aromatic hydrocarbon radicals containing 6 to 10 carbon atoms, preferably one or more benzene radicals, or by one or more heterocyclic radicals containing 5 to 14 carbon atoms and preferably 5 to 9 carbon atoms or ii. one or more optionally substituted aromatic hydrocarbon radicals containing 6 to 12 carbon atoms, preferably one or two benzene radicals or a heterocyclic radical with 5 to 14, preferably 5 to 9 carbon atoms.

The following poly-(5,6-dihydro-4H-1,3-oxazines) are mentioned by way of example:
1,3- and 1,4-bis-(5',6'-dihydro-4'H-1',3'-oxazin-2'-yl)-benzene; 1,3- and 1,4-bis-(5',5'-dimethyl-5',6'-dihydro-4'H-1',3'-oxazin-2'-yl)-benzene; 1,3- and 1,4-bis-(6'-methyl-5',6'-dihydro-4'H-1',3'-oxazin-2'-yl)-benzene; 1,3,5-tris-(5',6'-dihydro-4'H-1',3'-oxazin-2'-yl)-benzene; 2,6- and 3,5-bis-(5',6'-dihydro-4'H-1',3'-oxazin-2'-yl)-pyridine; 2,2'-bis-(5,6-dihydro-4H,1,3-oxazine); 1,2-bis-(5',6'-dihydro-4'H-1',3'-oxazin-2'-yl)-ethane; 1,4-bis-(5',6'-dihydro-4'H-1',3'-oxazin-2'-yl)-butane; 4,4'-bis-(5'',6''-dihydro-4''H-1'',3''-oxazin-2''-yl)diphenyl methane; 4,4'-bis-(5'',6''-dihydro-4''H-1'',3''-oxazin-2''-yl)-diphenyl oxide.

The poly-(5,6-dihydro-4H-1,3-oxazines) used can be prepared by the methods described in Ser. No. 299,791 filed Oct. 24, 1972.

The copolymers containing carboxyl groups comprise copolymerized units of the following monomers:

I. styrene, methyl styrene, α-methyl styrene, p-tert.-butyl styrene, halogen-substituted styrenes such as o-chlorostyrene and p-chlorostyrene, acrylonitrile or methacrylonitrile, preferably styrene and/or α-methyl styrene;

II. acrylic acid esters containing from 1 to 12 carbon atoms in the alcohol component and/or methacrylic acid esters containing 2 to 12 carbon atoms in the alcohol component, preferably said esters having up to 8 carbon atoms in the alcohol component;

III. methacrylic acid methyl ester and

IV. acrylic acid, methacrylic acid, crotonic acid, maleic acid, fumaric acid and itaconic acid, preferably (meth)acrylic acid.

In the context of the invention, the term copolymer includes not only copolymers of the specified composition, but also mixtures of copolymers, providing that the mixtures are prepared in such a way that the overall composition lies within the ranges mentioned above.

The copolymers are prepared by conventional methods of bulk, solution, dispersion and bead polymerisation, preferably by solution or bulk polymerisation. Methods of this kind are described for example in "Methoden der Organischen Chemie," Houben-Weyl, 4th Edition, Vol. 14/1, pages 24–556 (1961).

In cases where the polymerisation is carried out in solution, solvents such as methylene chloride, ethanol, isopropanol, n-propanol, n-butanol, iso-butanol, tert.-butanol, acetic acid methyl-to-butyl esters, acetone, methylethyl ketone, benzene, toluene, etc. may be used.

The polymerisation reactions are preferably carried out at temperatures of from 40° to about 180°C.

Examples of suitable initiators include percarbonates; peresters, such as tert.-butyl perpivalate or peroctoate; benzoyl peroxide; o-methoxy benzoyl peroxide, dichlorobenzoyl peroxide; and azodiisobutyrodinitrile; and are used in quantities of from 0.5 to 3% by weight, based on monomer.

Conventional molecular weight regulators, such as thioglycol, thioglycerin or tert.-dodecyl mercaptan, can also also be used.

The copolymer solution is freed from the solvent in suitable apparatus, preferably in evaporator screws, at temperatures of from about 90° to 180°C, for example by the process described in German Offenlegungsschrift No. 2,005,691, cooled, granulated and ground.

Isolation can, however, also be carried out by other methods, for example by spray drying, by removing the solvent with steam or by precipitation with water from a water-miscible solvent.

After isolation, the copolymers can be mixed with up to 150% by weight, based on copolymer, preferably up to 100% by weight, of inorganic or organic pigments, at temperatures of from 80° to about 120°C. The following are mentioned as examples of pigments: titanium dioxide, iron oxides, chromium oxide, lead chromates, cadmium sulphide, carbon black, aluminium and copper bronze, phthalocyanine and azo dyes.

The melts can also have added to them from 0.1 to 5% by weight, based on copolymer, of levelling agents such as silicones, poly-2-ethyl-hexylacrylate, polybutyl acrylate or their copolymers, cellulose derivatives; and catalysts such as organic and inorganic acids, tertiary amines, dicyanodiamide and tin compounds. Fillers, such as barium sulphate, aluminium oxide or tin oxide, may also optionally be added to the melts.

It is of course also possible to add pigments and levelling agents to the monomers before polymerisation or, in the event of solution polymerisation, to the copolymer solution before removal of the solvent.

The poly-(5,6-dihydro-4H-1,3-oxazine) is preferably mixed in together with the pigments, levelling agents and catalysts in a mixing screw at a temperature of from 80° to 120°C. The mixing times are preferably from about 1 minute to 10 minutes. Mixing for periods longer than this results in precrosslinking in the product. Under these conditions, a homogeneous mixture is formed, which does not disintegrate even when cooled.

The solvent-free, optionally pigmented mixtures which are brittle after cooling in their uncrosslinked state are ground to a fine grain size of from about 30 to 120 $\mu$ and optionally graded according to grain size.

The polymer powders used in accordance with the invention remain free-flowing at temperatures above 50°C, preferably above 60°C, have levelling temperatures of from about 80° to 120°C and being baked over periods of from 3 to 30 minutes at temperatures above about 130°C to 220°C, preferably at temperatures of from 160° to 200°C, accompanied by crosslinking.

The polymer powders have average molecular weights of from about 3,000 to 20,000, preferably from 3,000 to 10,000, as measured in an organic solvent such as acetone by the reduction in vapour-pressure method.

The powders may be applied to suitable substrates, especially metals by conventional electrostatic powder spraying methods (40 to 90 kV). cf. D. R. Davis "Coating with Electrostatic Dry-spray" in plastics technology, June 1962, pages 37 – 38.

The baked films (thickness from 40 to 300 $\mu$) of the polymer powders used in accordance with the invention show outstanding bond strength and hardness coupled with elasticity. They are also distinguished by their high gloss and outstanding weather resistance.

The powders may be used for coating domestic appliances, metal components in vehicle building, metal components which are severely exposed to weathering such as motor vehicle bodywork, facade panels, tubes and wire netting, and for coating tools for use in forestry and agriculture.

EXAMPLE 1 a. Preparation of the polymer 8 kg of a monomer mixture, comprising 50 parts by weight of styrene, 35 parts by weight of butyl acrylate, 15 parts by weight of acrylic acid, 1 part by weight of tert.-dodecyl mercaptan and 0.005 part by weight of hydroquinone, are heated under nitrogen in a 40-litre-capacity mixer vessel until a gentle reflux is set up. The temperature is adjusted to 130° to 140°C. A cooled mixture of 15 g of tert.-butyl perpivalate in petrol fraction (b.p.$_{760}$ 70° – 130°C) and 640 g of the monomer mixture is introduced into the monomer mixture initially introduced and polymerised with it over a period of 1 hour. Thereafter, the solids content is 80% (determined by concentrating a sample by evaporation for 30 minutes at 250°C). It is sufficient to restrict or to stop the introduction of initiator if the reaction becomes too violent.

A mixture of 16 kg of monomer mixture and 160 g of tert.-butyl perpivalate (the components being mixed shortly before introduction in a vessel cooled with brine) is introduced into the melt at 140° to 145°C over a period of 3 hours and the reaction mixture is heated to a temperature of 160°C after the reaction is complete. 180 g of di-tert.-butyl peroxide and 180 g of monomer mixture are then added dropwise over a period of a further hour. The volatile constituents (catalyst decomposition products and monomer impurities) are then distilled off and the temperature subsequently held at 170°C for 2 hours. This is followed by brief degassing in vacuo. The melt is then run off. The lacquer formed from the melt has a melting point of 95°C and can be converted into a powder without lumping. The average molecular weight is approximately 6,000, as measured by osmometry in acetone. The copolymer comprises approximately 50.0% by weight of styrene, approximately 15% by weight of acrylic acid and approximately 35% by weight of butyl acrylate.

b. Preparation of the lacquer powder

A mixture of 100 parts by weight of a polyacrylate prepared as described in (a), 20 parts by weight of 1,4-bis-(5',6'-dihydro-4'H-1',3'-oxazin-2'-yl)-benzene and 60 parts by weight of titanium dioxide (rutile type), is prepared in an extruder. The residence time in the extruder is about 30 seconds at 100° to 110°C.

After cooling, the extruded mixture is ground and sifted. The fraction having grain sizes of less than 80 μ can be stored almost indefinitely at 50°C without lumping and has the requisite free-flow properties. The powder mixture is applied to degreased metal panels by means of a conventional spray gun. The particles are negatively charged with respect to the panel, the voltage applied being 60 kV.

The coatings are baked for 30 minutes at 180°C and a scratch-resistant, elastic film is obtained that is unaffected by solvents.

A 70 μ thick film gives the following test results:

| | |
|---|---|
| Erichsen-indentation according to DIN 53 156 | 9.5 mm |
| Lattice cut according to DIN 53 151 | GT 1 |
| Mandrel-bending test according to Gardner | 2 mm |
| Gloss measurement according to ASTM D 523 (≭60°C) | 90% |
| Short-term weathering in a Sunshine weatherometer: | incipient chalking after 600 hours |

The 1,4-bis-(5',6'-dihydro-4'H-1',3'-oxazin-2'-yl)-benzene was prepared as follows:

1 430 g (12 mols) of thionyl chloride are introduced dropwise at 80°C into a suspension of 1,500 g (5.36 mols) of terephthalic acid-bis-(3-hydroxypropylamide) (Plaste und Kautschuk 6,372 (1959); m.p. 213°C) in 3 litres of dry benzene over a period of 7 hours. After the evolution of gas has stopped, the mixture is refluxed for 15 hours. The suspension is filtered off under suction, the filter cake washed with benzene and dried in vacuo at 40°C.

Yield: 1 607 g (94% of the theoretical) of terephthalic acid-bis-(3-chloropropyl amide); m.p. 212°C.

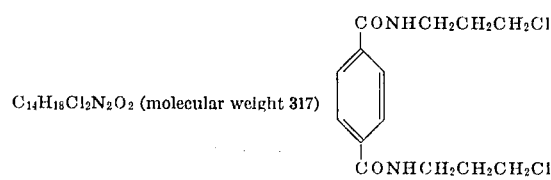

$C_{14}H_{18}Cl_2N_2O_2$ (molecular weight 317)

| | | | | | |
|---|---|---|---|---|---|
| Calculated: | C 53.0% | H 5.7% | Cl 22.4% | N 8.8% | O 10.1% |
| Found: | 52.8% | 5.9% | 22.1% | 8.8% | 10.5% |

159 g (0.5 mol) of terephthalic acid-bis-(3-chloropropyl amide) are stirred with 276 g (2 mols) of potassium carbonate in 600 ml of dimethyl formamide at 130°C for 4 hours. Inorganic salts are separated off by hot filtration under suction. The filtrate is allowed to cool and the precipitated crystalline product isolated. A second fraction can be obtained from the concentrated mother liquor.

Yield: 101 g (83% of the theoretical) of 1,4-bis-(5',6'-dihydro-4'H-1',3'-oxazin-2'-yl)-benzene; m.p. 220–222°C.

$C_{14}H_{16}N_2O_2$ (molecular weight 244)

| | | | | |
|---|---|---|---|---|
| Calculated; | C 68.9% | H 6.5% | N 11.5% | O 13.1% |
| Found: | 68.6% | 6.5% | 11.4% | 13.4% |

EXAMPLE 2

A mixture of:
100 parts by weight of a polyacrylate prepared as described in Example 1 a);
20 parts by weight of 1,3-bis-(5',6'-dihydro-4'H-1',3'-oxazin-2'-yl)-benzene;
60 parts by weight of titanium dioxide (rutile); and
2 parts by weight of the levelling agent consisting of a copolymer of 70% of 2-ethyl hexyl acrylate and 30% of ethyl acrylate is prepared in an extruder.

The residence time in the extruder is 30 seconds at a maximum temperature of 110°C. The solid mixture obtained is ground and sifted to grain sizes of less than 80 μ and remains free-flowing after storage at 50°C for 24 hours. The powder is electrostatically applied to metal panels as described in Example 1 and baked at 180°C and 190°C. The following results are obtained on 60 μ thick films:

| Baking time | 30 mins at 180°C | 15 mins at 190°C | 30 mins at 190°C |
|---|---|---|---|
| Erichsen indentation according to DIN 53 156 | 9.3 mm | 9.5 mm | 9.5 mm |
| Lattice cut according to DIN 53 151 | GT 1 | GT 1 | GT 1 |
| Mandrel-bending test according to Gardner | 2 mm | 2 mm | 2 mm |
| Gloss measurement according to ASTM D 523 (⊀ 60°C) | 90% | 95% | 95% |

The 1,3-bis-(5',6'-dihydro-4'H-1',3'-oxazin-2'-yl)-benzene was prepared as follows:

23 g of methanol are distilled off on a falling condenser from a mixture of 97 g (0.5 mol) of isophthalic acid dimethyl ester and 113 g (1.5 mols) of 3-amino-1-propanol in a bath heated to 140°C over a period of 1.5 hours. The crystalline residue is recrystallised from 250 ml of methanol.

Yield: 110 g (78% of the theoretical) of isophthalic acid-bis-(3-hydroxy-propylamide); m.p. 120° – 122°C.

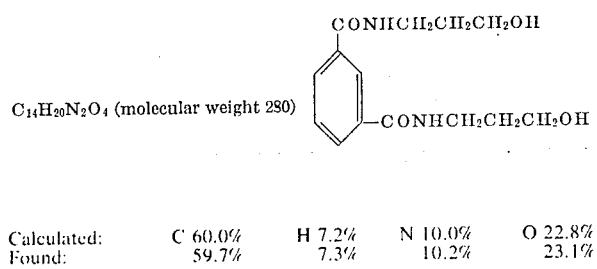

$C_{14}H_{20}N_2O_4$ (molecular weight 280)

| | | | | |
|---|---|---|---|---|
| Calculated: | C 60.0% | H 7.2% | N 10.0% | O 22.8% |
| Found: | 59.7% | 7.3% | 10.2% | 23.1% |

27 g (0.22 mol) of thionyl chloride are introduced dropwise at 80°C into a solution of 28 g (0.1 mol) of isophthalic acid-bis-(3-hydroxypropyl amide) in 150 ml of dry benzene.

Stirring is continued until the evolution of gas has stopped, the precipitated semi-solid product is filtered off under suction and recrystallised from xylene.

Yield: 23 g (73% of the theoretical) of isophthalic acid-bis-(3-chloropropyl amide); m.p. 119°C.

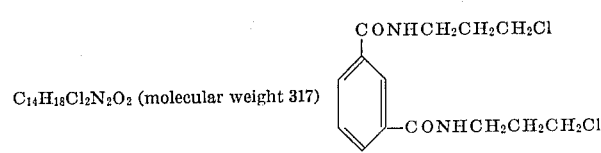

$C_{14}H_{18}Cl_2N_2O_2$ (molecular weight 317)

| | | | | | |
|---|---|---|---|---|---|
| Calculated: | C 53.0% | H 5.7% | Cl 22.4% | N 8.8% | O 10.1% |
| Found: | 53.6% | 5.7% | 22.4% | 8.7% | 10.3% |

15.9 g (0.05 mol) of isophthalic acid-bis-(3-chloropropylamide) are stirred with 69 g (0.5 mol) of potassium carbonate in 100 ml of dimethyl formamide at 130°C for 10 hours. Inorganic salts are separated by hot filtration under suction and the filtrate concentrated in vacuo. The residue obtained from this concentrate is recrystallized from cleaning spirit.

Yield: 8.1 g (66% of the theoretical) of 1,3-bis-(5',6'-dihydro-4'H-1',3'-oxazin-2'-yl)-benzene; m.p. 84°C.

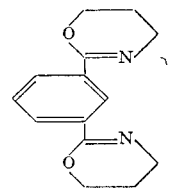

$C_{14}H_{16}N_2O_2$ (molecular weight 244)

| | | | | |
|---|---|---|---|---|
| Calculated: | C 68.9% | H 6.5% | N 11.5% | O 13.1% |
| Found: | 68.4% | 6.5% | 11.3% | |

EXAMPLE 3

An acrylate resin with a measured molecular weight of approximately 5,000 is prepared by the polymerisation process described in Example 1 from 35% by weight of butyl acrylate, 25% by weight of styrene, 10% by weight of methacrylic acid butyl ester, 15% by weight of methacrylic acid methyl ester and 15% by weight of acrylic acid.

100 parts by weight of the polymer are homogenised in an extruder with 15 parts by weight of 1,4-bis-(5',6'-dihydro-4'H-1',3'-oxazin-2'-yl)-benzene and 60 parts by weight of titanium dioxide (rutile). The residence time in the extruder is 20 seconds at a maximum temperature of 110°C. The mixture is worked up as described in Example 1 into a powder which can be stored without lumping at 55°C for at least 48 hours. The powder is applied electrostatically to metal panels and the coatings baked at 180°C for 30 minutes.

The following test results are obtained from 70 μ thick films:

| | |
|---|---|
| Erichsen indentation according to DIN 53 156 | 9.0 mm |
| Lattice cut according to DIN 53 151 | GT 1 |
| Mandrel-bending test according to Gardner | 4 mm |
| Gloss measurement according to ASTM D 523 (⊀ 60°C) | 90% |
| Short-term weathering in a Sunshine weatherometer: | incipient chalking after 750 hours. |

EXAMPLE 4

A powdered mixture is prepared as described in Example 1 with the exception that equal parts by weight of 1,3,5-tris-(5',6'-dihydro-4'H-1',3'-oxazin-2'-yl)-benzene are used instead of the 1,4-bis-(5',6'-dihydro- 4'H-1',3'-oxazin-2'-yl)-benzene. A powder which can be stored indefinitely at 50°C is obtained. This powder gives thoroughly crosslinked, hard high-gloss films after being fired at 180°C for 30 minutes.

The 1,3,5-tris-(5',6'-dihydro-4'H-1',3'-oxazin-2'-yl)-benzene is prepared as follows:

1,3,5-tris-(5',6'-dihydro-4'H-1',3'-oxazin-2'-yl)-benzene 49 g of methanol are distilled off on a falling condenser from a mixture of 151 g (0.6 mol) of benzene-1,3,5-tricarboxylic acid trimethyl ester and 202 g (2.7 mol) of 3-amino-1-propanol over a period of 2 hours at a bath temperature of 140°C. The waxy residue is digested with acetone and the crystalline residue is recrystallized from a mixture of 600 ml methanol and 1300 ml acetone.

Yield: 167 g (73% of the theoretical) of benzene-1,3,5-tricarboxylic acid-tris(3'-hydroxypropyl amide); m.p. 167°C. $C_{18}H_{27}N_3O_6$ (molecular weight 381).

| | | | | |
|---|---|---|---|---|
| Calculated: | C 56.7% | H 7.1% | N 11% | O 25.2% |
| Found: | 57.1% | 7.2% | 11.1% | — |

64 g (0.54 mol) of thionyl chloride are introduced dropwise at 80°C into a suspension of 57 g (0.15 mol) of benzene-1,3,5-tricarboxylic acid tris-(3'-hydroxypropyl amide) in 250 ml of dry benzene. The mixture is stirred at 80°C until the evolution of gas is over, after which the solid phase is isolated by filtration and recrystallized from a little amount of ethanol.

Yield: 44 g (67% of the theoretical) of benzene-1,3,5-tricarboxylic acid-tris(3'-chloropropyl amide); softening point 65°C, $C_{18}H_{24}Cl_3N_3O_3$ (molecular weight 436,5).

| | |
|---|---|
| Calculated: | Cl 24.4% |
| Found: | 24.4% |

39.9 g (0.09 mol) of benzene-1,3,5-tricarboxylic acid tris-(3'-hydroxypropyl amide) and 124 g (0.9 mol) of potassium carbonate are heated with stirring at 130°C in 200 ml of dimethyl formamide for 10 hours. Inorganic salts are isolated by filtration at 90°C, the filtrate is left to cool and the product which precipitates from the filtrate is recrystallized from methanol.

Yield: 27 g (90% of the theoretical) of 1,3,5-tris-(5',6'-dihydro-4'H-1',3'-oxazine-2'-yl)-benzol; m.p. 312°C (decomposition; quickly heated). $C_{18}H_{21}H_3O_3$ (molecular weight 327)

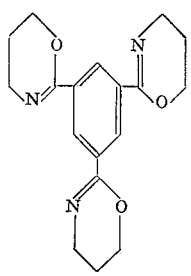

| | | | | |
|---|---|---|---|---|
| Calculated: | C 66.0% | H 6.5% | N 12.8% | O 14.7% |
| Found: | 65.6% | 6.6% | 12.8% | — |

What is claimed is:
1. A coating agent in powder form comprising a mixture of
   A. copolymerized units of
   I from 25 to 50% by weight of styrene, α-methyl styrene, o-chlorostyrene, p-chlorostyrene, p-tert.-butyl styrene, acrylonitrile, methacrylonitrile or a mixture thereof;
   II from 30 to 65% by weight of an acrylic acid ester containing from 1 to 12 carbon atoms in the alcohol radical or a methacrylic acid ester containing from 2 to 12 carbon atoms in the alcohol radical, or a mixture thereof;
   III from 0 to 25% by weight of methacrylic acid methyl ester and
   IV from 5 to 20% by weight of acrylic acid, methacrylic acid, itaconic acid, maleic or fumaric acid, crotonic acid or a mixture thereof,
   the average molecular weight being from about 3,000 to 20,000 and
   B. a compound of the formula

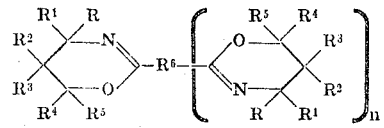

wherein n is 1 or 2; R, $R^1$, $R^2$, $R^3$, $R^4$ and $R^5$ are the same or different and are each hydrogen or hydrocarbon having from 1 to 6 carbon atoms and $R^6$ represents a bond or a radical from the following groups:
   i. a cycloaliphatic hydrocarbon radical with 3 to 10 carbon atoms, an optionally partially unsaturated alkylene radical with 1 to 18 carbon atoms which may optionally be interrupted by one or more aromatic hydrocarbon radicals containing 6 to 10 carbon atoms or by one or more heterocyclic radicals containing 5 to 14 carbon atoms, or
   ii. one or more optionally substituted aromatic hydrocarbon radicals containing 6 to 12 carbon atoms or a heterocyclic radical with 5 to 14 carbon atoms, the mixture containing from 5 to 25 parts by weight of (B) and from 95 to 75 parts by weight of (A).

2. The coating agent of claim 1 wherein (B) is 1,4-bis-(5',6'-dihydro-4'H-1',3'-oxazin-2'-yl)-benzene.

3. The coating agent of claim 1 wherein (B) ils 1,3-bis-(5',6'-dihydro-4'H-1',3'-oxazin-2'-yl)-benzene.

4. The coating agent of claim 1 wherein (B) is 2,2'-bis-(5,6-dihydro-4H-1,3-oxazine).

5. The coating agent of claim 1 wherein (B) is 3,5-bis-(5',6'-dihydro-4'H-1',3'-oxazin-2'-yl)-pyridine.

6. The coating agent of claim 1 wherein (B) is 1,3,5-tris-(5',6'-dihydro-4'H-1',3'-oxazin-2'-yl)-benzene.

7. The coating agent of claim 1 wherein (A) consists essentially of copolymerized units of I-IV.

8. The coating agent of claim 1 including one or more pigments in an amount of up to 150% by weight based on (A) and (B).

9. The coating agent of claim 1 including one or more levelling agents in an amount of from 0.1 to 5% by weight based on (A).

* * * * *